United States Patent
Hwang et al.

(10) Patent No.: US 12,247,606 B2
(45) Date of Patent: Mar. 11, 2025

(54) CLINCHING-TYPE BLIND HYBRID FASTENING APPARATUS

(71) Applicant: SUNG WOO HITECH CO., LTD., Busan (KR)

(72) Inventors: Seok Hwan Hwang, Busan (KR); Yun Sung Chung, Busan (KR); Sung Man Sohn, Yangsan-si (KR)

(73) Assignee: SUNG WOO HITECH CO., LTD., Busan (KR)

( * ) Notice: Subject to any disclaimer, the term of this patent is extended or adjusted under 35 U.S.C. 154(b) by 207 days.

(21) Appl. No.: 18/088,043

(22) Filed: Dec. 23, 2022

(65) Prior Publication Data
US 2024/0141946 A1 May 2, 2024

(30) Foreign Application Priority Data
Nov. 2, 2022 (KR) .......................... 10-2022-0144115

(51) Int. Cl.
*F16B 37/06* (2006.01)
(52) U.S. Cl.
CPC .................................. *F16B 37/065* (2013.01)
(58) Field of Classification Search
CPC ...... F16B 13/061; F16B 19/04; F16B 37/065; F16B 19/1036
USPC ............................................. 411/32, 34, 183
See application file for complete search history.

(56) References Cited

U.S. PATENT DOCUMENTS

| | | | | | |
|---|---|---|---|---|---|
| 2,562,336 | A | * | 7/1951 | Selden | F16B 5/04 29/523 |
| 3,296,765 | A | * | 1/1967 | Rohe | B64C 1/12 29/523 |
| 3,313,079 | A | * | 4/1967 | Phelan | F16B 5/01 52/793.1 |
| 3,355,850 | A | * | 12/1967 | Rohe | F16B 39/34 52/793.1 |
| 4,717,612 | A | * | 1/1988 | Shackelford | F16B 37/067 428/116 |
| 6,761,520 | B1 | * | 7/2004 | Dise | F16B 37/067 411/113 |
| 7,010,845 | B2 | * | 3/2006 | Muller | F16B 5/04 29/897 |

* cited by examiner

*Primary Examiner* — Flemming Saether
(74) *Attorney, Agent, or Firm* — LEX IP MEISTER, PLLC

(57) ABSTRACT

To improve fastening precision and economic feasibility, the present disclosure provides a clinching-type blind hybrid fastening apparatus inserted into and fastened to a frame part through which a first coupling hole is formed in a hollow shape and on one side of an upper surface thereof and a second coupling hole is formed on a lower surface thereof, the apparatus including a body part which is inserted into the frame part and has an outer lower surface rim seated on an upper surface rim of the second coupling hole, a blind fastening part including a rivet fastening portion that integrally extends upward from the body part and has an upper end disposed above the first coupling hole, a close contact step portion that is integrally formed at an upper portion of the rivet fastening portion, and a head portion that extends outward from an upper end of the close contact step portion, and a clinching fastening part that is integrally extending downward from the body part and has a lower end disposed below the second coupling hole.

3 Claims, 5 Drawing Sheets

CLINCHING-TYPE BLIND HYBRID FASTENING APPARATUS

CROSS-REFERENCE TO RELATED APPLICATION

This application claims priority to and the benefit of Korean Patent Application No. 10-2022-0144115 filed on Nov. 2, 2022, the disclosure of which is incorporated herein by reference in its entirety.

BACKGROUND

1. Field of the Invention

The present disclosure relates to a clinching-type blind hybrid fastening apparatus, and more particularly, to a clinching-type blind hybrid fastening apparatus having improved fastening precision and improved economic feasibility.

2. Discussion of Related Art

In general, blind rivets are used in various applications including fastening thin plates to relatively thick components and are used in various materials from steel to plastic.

Here, the blind rivets may be provided as permanent fastening elements for overlapping and fixing two or more plate materials or section steels. The blind rivets are widely used in vehicles, ships, bridges, and steel structures because the blind rivets have a simple structure, high applicability, and high capacity to transmit a force acting between members. Further, the blind rivets may be used for pressure containers or container boxes that require airtightness as the two plate materials are combined.

Further, in general, the blind rivets may include a rivet having a body portion extending from an inner end of a head portion and a stem portion provided to fasten the rivet to the plate material as an end portion of the body portion provided in the rivet inserted between the plate materials is deformed.

However, in the case of the blind rivet according to the related art, when the rivet is coupled to support a portion between an upper hole formed at an upper portion of the plate material and a lower hole formed at a lower portion of the plate material, it is difficult to support rims of the upper hole and the lower hole at the same time.

SUMMARY OF THE INVENTION

The present disclosure is directed to providing a clinching-type blind hybrid fastening apparatus having improved fastening precision and improved economic feasibility.

The present disclosure provides a clinching-type blind hybrid fastening apparatus inserted into and fastened to a frame part through which a first coupling hole is formed in a hollow shape and on one side of an upper surface thereof and a second coupling hole is aligned with the first coupling hole in a vertical direction and is formed on one side of a lower surface thereof, the apparatus including a body part which is inserted into the frame part and extends in the vertical direction, through which a through-hole is formed on an inner side thereof in the vertical direction, and in which a fastening screw thread is formed in an inner circumference of the through-hole and an outer lower surface rim thereof is seated on an upper surface rim of the second coupling hole, a blind fastening part including a rivet fastening portion that integrally extends upward from an upper end rim of the body part and has an upper end disposed above the first coupling hole, a close contact step portion that is integrally formed at an upper portion of the rivet fastening portion and formed to exceed a thickness of the rivet fastening portion, and a head portion that is integrally curved and extends outward along a circumference from an upper end of the close contact step portion to face the upper surface rim of the first coupling hole in the vertical direction, and a clinching fastening part that is integrally extending downward from a lower end of the body part along a rim of the through-hole and has a lower end disposed below the second coupling hole.

The present disclosure also provides a clinching-type blind hybrid fastening apparatus including a frame part through which a first coupling hole is formed in a hollow shape and on one side of an upper surface thereof and a second coupling hole is aligned with the first coupling hole in a vertical direction and is formed on one side of a lower surface thereof, a body part which is inserted into the frame part and extends in the vertical direction, through which a through-hole is formed on an inner side thereof in the vertical direction, and in which a fastening screw thread is formed in an inner circumference of the through-hole and an outer lower surface rim thereof is seated on an upper surface rim of the second coupling hole, a blind fastening part including a rivet fastening portion that integrally extends upward from an upper end rim of the body part and has an upper end disposed above the first coupling hole, a close contact step portion which is integrally formed at an upper portion of the rivet fastening portion, has an upper surface integrally connected to a lower surface of the head portion, is formed to exceed a thickness of the rivet fastening portion, and has an outer diameter set to correspond to an inner diameter of the first coupling hole so that an outer surface thereof is in close contact with the first coupling hole, and a head portion that is integrally curved and extends outward along a circumference from an upper end of the close contact step portion to face the upper surface rim of the first coupling hole in the vertical direction, and a clinching fastening part that extends integrally downward from a lower end of the body part along a rim of the through-hole and has a lower end riveted to a lower surface rim of the second coupling hole.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a clinching-type blind hybrid fastening apparatus according to an embodiment of the present disclosure will be described in detail with reference to the accompanying drawings.

Figure 1:
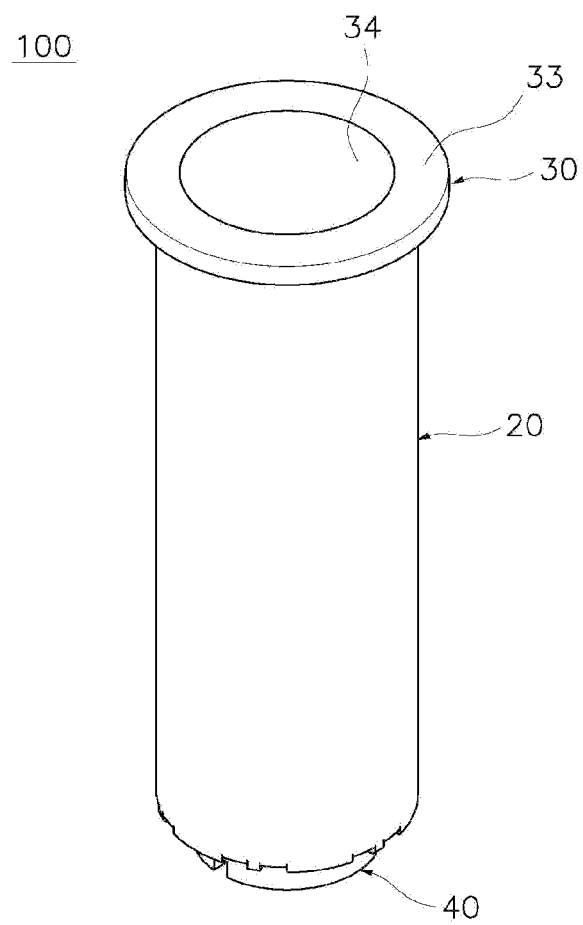
FIGS. 1 and 2 are perspective views illustrating a clinching-type blind hybrid fastening apparatus according to an embodiment of the present disclosure.
Figure 2:
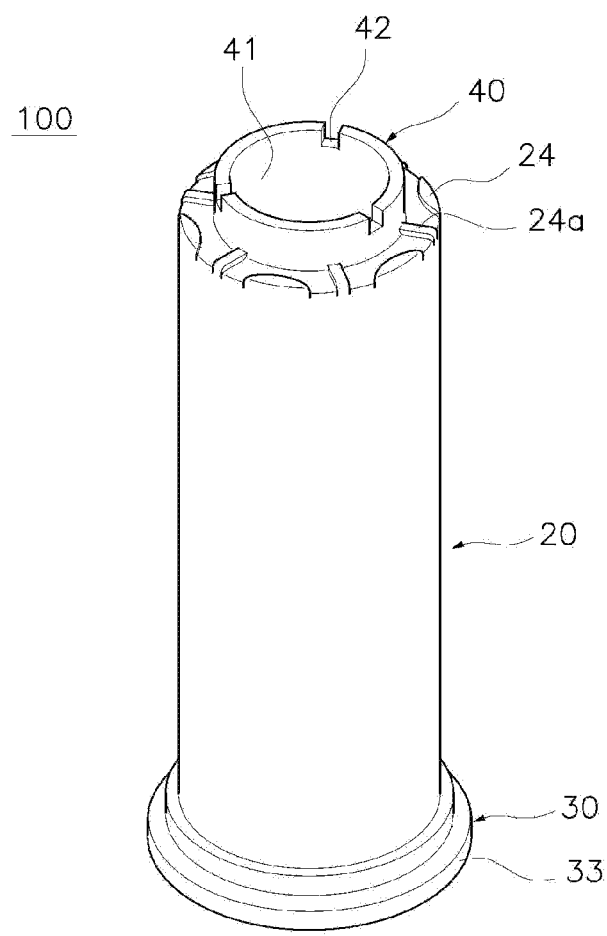
Figure 3:
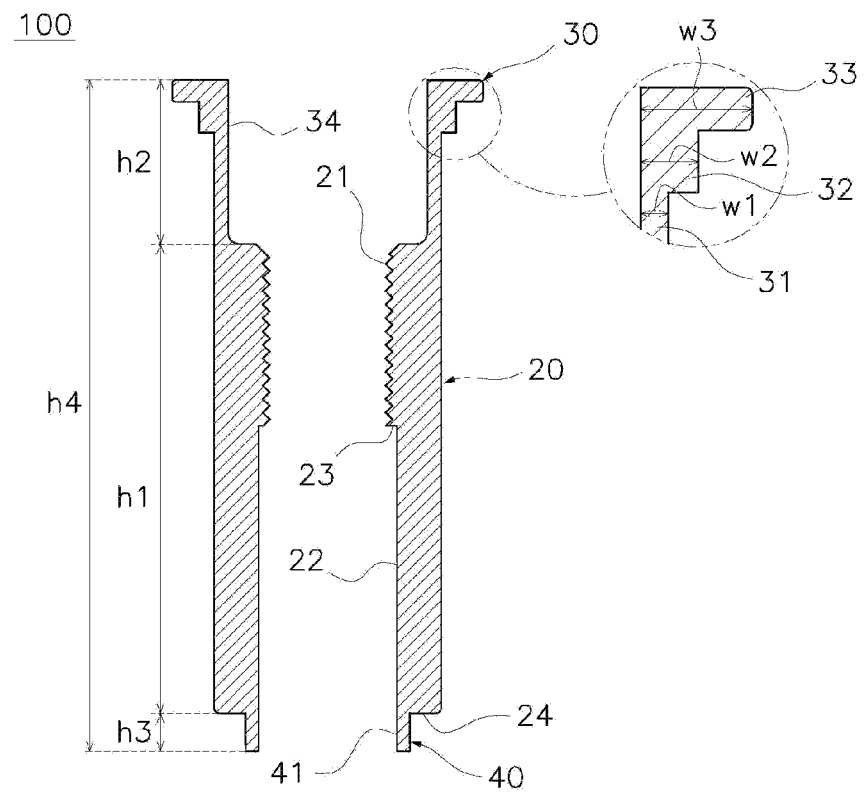
FIG. 3 is a cross-sectional view illustrating the clinching-type blind hybrid fastening apparatus according to the embodiment of the present disclosure.
Figure 4:
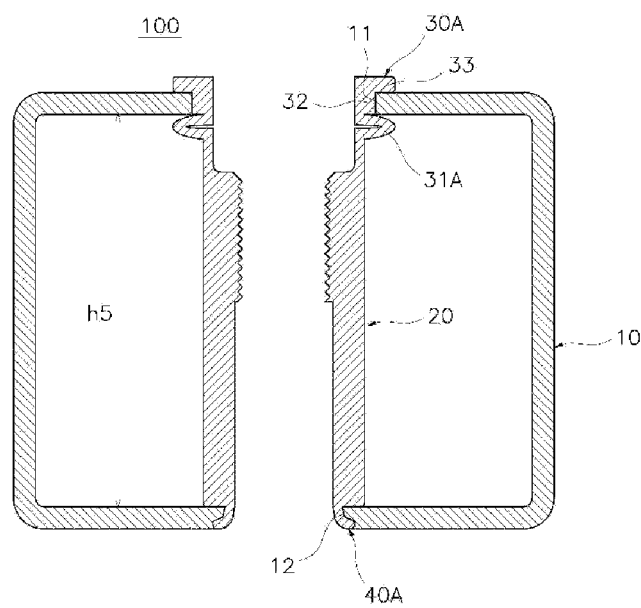
FIG. 4 is part cross-sectional view illustrating a usage state of the clinching-type blind hybrid fastening apparatus according to the embodiment of the present disclosure.
Figure 5:
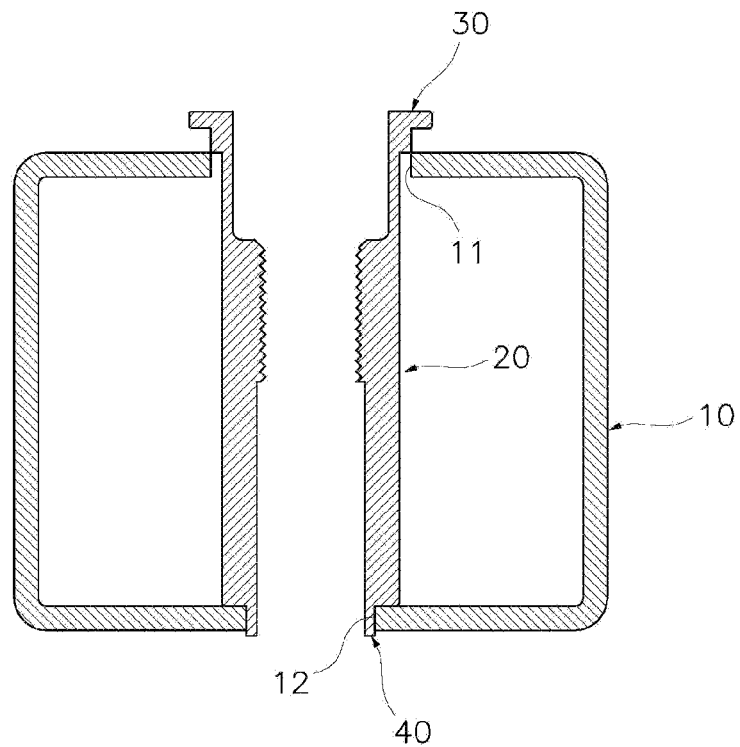
FIGS. 5 to 7 are diagrams illustrating a fastening process of the clinching-type blind hybrid fastening apparatus according to the embodiment of the present disclosure.
Figure 6:
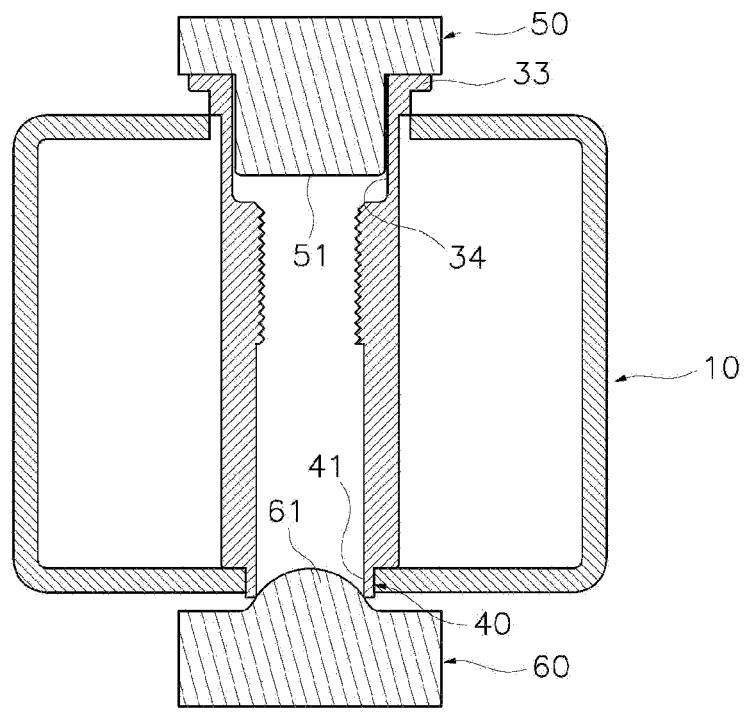
Figure 7:
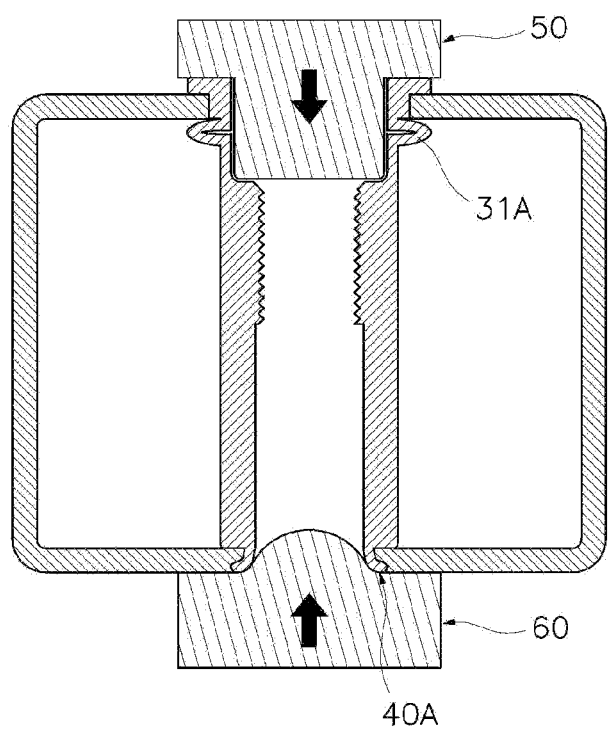

FIGS. 1 and 2 are perspective views illustrating a clinching-type blind hybrid fastening apparatus according to an embodiment of the present disclosure, FIG. 3 is a cross-sectional view illustrating the clinching-type blind hybrid fastening apparatus according to the embodiment of the present disclosure, FIG. 4 is part cross-sectional view illustrating a usage state of the clinching-type blind hybrid fastening apparatus according to the embodiment of the present disclosure, and FIGS. 5 to 7 are diagrams illustrating a fastening process of the clinching-type blind hybrid fastening apparatus according to the embodiment of the present disclosure.

As illustrated in FIGS. 1 to 7, a clinching-type blind hybrid fastening apparatus 100 according to an embodiment of the present disclosure includes a body part 20, a blind fastening part 30, and a clinching fastening part 40. Further, the clinching-type blind hybrid fastening apparatus 100 according to the embodiment of the present disclosure may further include a frame part 10.

Here, the clinching-type blind hybrid fastening apparatus 100 according to the embodiment of the present disclosure is an apparatus which is inserted into and fastened to the frame part 10 through which a first coupling hole 11 and a second coupling hole 12 are formed.

In this case, due to the clinching-type blind hybrid fastening apparatus 100, a portion between rims of the first coupling hole 11 and the second coupling hole 12 can be supported, and an interval between the first coupling hole 11 and the second coupling hole 12 can be maintained.

Here, the frame part 10 may be formed in a hollow quadrangular cross section, the first coupling hole 11 may be formed through one side of an upper surface of the frame part 10, and the second coupling hole 12 may be formed through one side of a lower surface aligned with the first coupling hole 11 in a vertical direction. In this case, an outer diameter of the first coupling hole 11 may be greater than or equal to an outer diameter of the second coupling hole 12. The frame part 10 may be extruded and provided with an aluminum material, but the present disclosure is not limited thereto.

Meanwhile, the body part 20, the blind fastening part 30, and the clinching fastening part 40 may be formed integrally with each other and be made of a metal material.

In detail, the body part 20 may be inserted into the frame part 10 and extend in the vertical direction and an outer lower surface rim 24 may be seated on an upper surface rim of the second coupling hole 12. To this end, the body part 20 may be provided in a cylindrical shape, and an outer diameter of the body part 20 may be set to be less than an inner diameter of the first coupling hole 11 and exceed an inner diameter of the second coupling hole 12.

Further, through-holes 21 and 22 may be vertically formed through the body part 20 at an inside of the body part 20 in a radial direction, and fastening screw threads may be formed on inner circumferences of the through-holes 21 and 22. In this case, the through-holes 21 and 22 may include a first through-hole 21 and a second through-hole 22.

For example, the first through-hole 21 having a first inner diameter may be vertically formed through the body part 20 at an inner upper portion of the body part in a radial direction. Further, the second through-hole 22 having a second inner diameter exceeding the first inner diameter may communicate with the first through-hole 21 and be vertically formed through the body part 20 at an inner lower portion of the body part 20 in the radial direction. Further, a stepped portion 23 may be formed to be stepped in a boundary region between the first through-hole 21 and the second through-hole 22.

Further, the fastening screw thread may be formed on the inner circumference of the first through-hole 21 or the inner circumference of the second through-hole 22, and in some cases, may be formed in the entire inner circumferences of the first through-hole 21 and the second through-hole 22.

Further, a length h1 of the body part 20 in the vertical direction may be set to a length less than an interval h5 between the first coupling hole 11 and the second coupling hole 12.

In addition, a sum h4 of lengths of the body part 20, the blind fastening part 30, and the clinching fastening part 40 may be set to exceed the interval h5 between the first coupling hole 11 and the second coupling hole 12. That is, the sum of the lengths of the body part 20, the blind fastening part 30, and the clinching fastening part 40 means a sum of the length h1 of the body part 20 in the vertical direction, the length h2 of the blind fastening part 30 in the vertical direction, and a length h3 of the clinching fastening part 40 in the vertical direction.

Further, in some cases, a pressing protrusion 24a protruding downward to press the upper surface rim of the second coupling hole 12 may be formed at the outer lower surface rim 24 of the body part 20. For example, a plurality of pressing protrusions 24a may protrude downward along a circumference of the outer lower surface rim 24 of the body part 20. In this case, a protrusion length of the pressing protrusions 24a may be set to be less than a length of the blind fastening part 30. Therefore, as the pressing protrusion 24a is pressed against the upper surface rim of the second coupling hole 12, a coupling force between the body part 20 and the upper surface rim of the second coupling hole 12 can be improved.

Meanwhile, the blind fastening part 30 includes a rivet fastening portion 31, a close contact step portion 32, and a head portion 33.

Here, the rivet fastening portion 31 may extend upward in a straight line integrally from an upper end rim of the body part 20, and an upper end of the rivet fastening portion 31 may be disposed above the first coupling hole 11.

In this case, a length by which the rivet fastening portion 31 extends in the vertical direction may be set to exceed a thickness of the first coupling hole 11 in the vertical direction. Further, an outer diameter of the rivet fastening portion 31 may be set to be less than the inner diameter of the first coupling hole 11.

Further, the rivet fastening portion 31 is plastically deformed into a rivet fastening portion 31A that is curvedly deformed in a shape convex outward in the radial direction, and thus may be riveted to a lower surface rim of the first coupling hole 11.

That is, in FIG. 3, the rivet fastening portion 31 of the blind fastening part 30 may extend upward in a straight line. Further, in FIG. 4, the deformed rivet fastening portion 31A of the blind fastening part 30 may be curved and plastically deformed.

Meanwhile, a lower surface of the close contact step portion 32 may be integrally stepped on an upper portion of the rivet fastening portion 31, and the close contact step portion 32 may have an outer diameter corresponding to the inner diameter of the first coupling hole 11. Here, a thickness w2 of the close contact step portion 32 may exceed a thickness w1 of the rivet fastening portion 31 and may be less than a thickness w3 of the head portion 33.

In this case, a lower inner end of the close contact step portion 32 may be integrally connected to an upper end of the rivet fastening portion 31, and an upper surface thereof may be integrally stepped with and connected to an inner lower surface of the head portion 33. Further, an outer surface of the close contact step portion 32 may be coupled in close contact with the inner circumference of the first coupling hole 11.

Meanwhile, the head portion 33 may be integrally curved and extend outward along a circumference from an upper end of the close contact step portion 32 to face the upper surface rim of the first coupling hole 11 in the vertical direction. For example, when the body part 20 is provided in a cylindrical shape, the head portion 33 may be curved and extend radially outward in a circumferential direction from an upper end of the close contact step portion 32. Here, an outer diameter of the head portion 33 may be set to exceed the inner diameter of the first coupling hole 11.

Further, when the rivet fastening portion 31A is plastically deformed, the head portion 33 may be caught by and coupled to the upper surface rim of the first coupling hole 11. In this case, a lower surface rim of the head portion 33 moves downward while being spaced apart from the upper surface rim of the first coupling hole 11, and thus may be in close contact with the upper surface rim of the first coupling hole 11.

Further, in the blind fastening part 30, a recessed portion 34 may be recessed downward into the rivet fastening portion 31, and a center of a bottom surface of the recessed portion 34 may communicate with the through-holes 21 and 22. Here, a holder protrusion 51 protruding downward from a central portion of an upper holder 50, which will be described below, may be selectively inserted into and engaged with the recessed portion 34.

Meanwhile, the clinching fastening part 40 may extend downward in a straight line integrally from a lower end of the body part 20, and a lower end of the clinching fastening part 40 may be disposed below the second coupling hole 12. In this case, the clinching fastening part 40 may extend downward integrally from the edges of the through-holes 21 and 22. For example, the clinching fastening part 40 may extend downward to have a ring-shaped cross section in the circumferential direction from the edges of the through-holes 21 and 22.

Here, a length by which the clinching fastening part 40 extends in the vertical direction may be set to exceed a thickness of the second coupling hole 12 in the vertical direction. Further, an outer diameter of the clinching fastening part 40 may be set to correspond to the inner diameter of the second coupling hole 12.

In this case, a third through-hole 41 communicating with the through-holes 21 and 22 may be vertically formed through an inner circumference of the clinching fastening part 40. Here, a fixing protrusion 61 protruding upward from a central portion of a lower die 60, which will be described below, may be selectively inserted into and engaged with the third through-hole 41.

Further, the clinching fastening part 40 is plastically deformed into a clinching fastening part 40A that is curvedly deformed radially outward toward the lower end, and thus may be riveted to a lower surface rim of the second coupling hole 12.

That is, in FIG. 3, the clinching fastening part 40 may extend downward in a straight line. Further, in FIG. 4, the deformed clinching fastening part 40 may be curved and plastically deformed.

Meanwhile, a fastening method for the clinching-type blind hybrid fastening apparatus 100 will be described with reference to FIGS. 5 to 7.

First, referring to FIG. 5, the body part 20, the blind fastening part 30, and the clinching fastening part 40 may be inserted into the frame part 10 through the first coupling hole 11. Further, the outer lower surface rim 24 of the body part 20 may be seated on the upper surface rim of the second coupling hole 12.

At the same time, an outer surface of the clinching fastening part 40 may be in close contact with an inner circumference of the second coupling hole 12, and a lower end of the clinching fastening part 40 may be disposed below the second coupling hole 12.

In addition, one side of an outer surface of the rivet fastening portion 31 may be spaced apart from and face the inner circumference of the first coupling hole 11. In this case, the close contact step portion 32 and the head portion 33 may be arranged above the first coupling hole 11.

Further, referring to FIGS. 6 and 7, in a state in which the lower die 60 supports the clinching fastening part 40, the upper holder 50 may press the blind fastening part 30 in a downward direction.

Here, an outer lower surface rim of the upper holder 50 may be in surface contact with an upper surface of the head portion 33. Further, the holder protrusion 51 protruding downward from a central portion of the upper holder 50 may be inserted into and engage with the recessed portion 34. In this case, an outer diameter of the holder protrusion 51 may be set to correspond to an inner diameter of the recessed portion 34.

Further, an outer upper surface rim of the lower die 60 may be in contact with a lower end of the clinching fastening part 40. Further, the fixing protrusion 61 protruding upward from a central portion of the lower die 60 may be inserted into the third through-hole 41. That is, the fixing protrusion 61 may be inserted into the clinching fastening part 40. Here, the fixing protrusion 61 may be rounded in an upwardly convex shape.

Further, the upper holder 50 may press the blind fastening part 30 in a downward direction, and thus the rivet fastening portion 31 may be plastically deformed into the rivet fastening portion 31A deformed to be curved radially outward in a convex shape. Accordingly, the deformed rivet fastening portion 31A may be riveted to the lower surface rim of the first coupling hole 11.

In addition, the clinching fastening part 40 is upwardly pressed against the lower die 60 by the downward pressing of the upper holder 50, and the clinching fastening part 40 may be plastically deformed into the clinching fastening part 40A that is deformed to be curved radially outward toward a lower end. Accordingly, the deformed clinching fastening part 40A may be riveted to the lower surface rim of the second coupling hole 12.

In this way, in the present disclosure, a thickness of the close contact step portion 32 formed at an upper portion of the rivet fastening portion 31 and in close contact with the first coupling hole 11 may be set to exceed the rivet fastening portion 31. Here, the rivet fastening portion 31 can be guided due to a thickness difference between the rivet fastening portion 31 and the close contact step portion 32 so that the rivet fastening portion 31 is precisely riveted to the lower surface rim of the first coupling hole 11 during the plastic deformation. That is, the rivet fastening portion 31 thinner than the close contact step portion 32 may be plastically deformed. Thus, fastening precision of the blind fastening part can be remarkably improved.

Further, the upper surface of the close contact step portion 32 is integrally stepped with and connected to the lower surface of the head portion 33, and thus the close contact step portion 32 may be closely coupled to the inner circumference and the upper surface rim of the first coupling hole 11 at the same time. At the same time, the clinching fastening part 40 may be riveted to the second coupling hole 12. Therefore, when the fastening screw thread is fastened, the body part 20, the blind fastening part 30, and the clinching fastening part 40 are prevented from being separated from the frame part 10 or spinning, so that fastening convenience can be remarkably improved.

Further, as the body part 20 is inserted into the frame part 10, the blind fastening part 30 and the clinching fastening part 40 may be plastically deformed by and riveted to respective edges of the first coupling hole 11 and the second coupling hole 12 at the same time.

Thus, when a bolt (not illustrated) is fastened to the fastening screw thread, an interval between the edges of the first coupling hole 11 and the second coupling hole 12 can be maintained due to the body part 20, the blind fastening part 30, and the clinching fastening part 40, and thus the first coupling hole 11 and the second coupling hole 12 can be stably supported.

The present disclosure provides the following effects according to the embodiment described above.

First, a thickness of a close contact step portion formed at an upper portion of a rivet fastening portion and in close contact with a first coupling hole of a frame part is set to exceed a thickness of the rivet fastening portion, and the rivet fastening portion is guided to be precisely riveted to a lower surface rim of the first coupling hole during plastic deformation, so that fastening precision can be remarkably improved.

Second, an upper surface of the close contact step portion is integrally stepped with and connected to a lower surface of a head portion, and is thus coupled in close contact with an inner circumference and an upper surface rim of the first coupling hole, and at the same time, a clinching fastening part is riveted to a second coupling hole of the frame part. Therefore, when a fastening screw thread is fastened, separation or spanning is prevented, and thus fastening convenience can be remarkably improved.

Third, a body part is inserted into the frame part, a blind fastening part and the clinching fastening part connected to an upper portion and a lower portion of the body is plastically deformed and riveted to rims of the first coupling hole and the second coupling hole. Thus, when the fastening screw thread is fastened with a bolt, an interval between the rims of the first coupling hole and the second coupling hole can be maintained, and the coupling therebetween can be stably supported.

In this case, terms such as "includes", "constitutes", or "has" described above mean that the corresponding component may be inherent unless otherwise stated, and thus should be construed as not excluding other components but further including other components. All terms including technical or scientific terms have the same meanings as those commonly understood by those skilled in the art to which the present disclosure pertain unless otherwise defined. The generally used terms defined in dictionaries should be construed as having the meanings that coincide with the meanings of the contexts of the related technologies, and should not be construed as ideal or excessively formal meanings unless clearly defined in the present disclosure.

As described above, the present disclosure is not limited to the above-described respective embodiments, modifications could be made by those skilled in the art to which the present disclosure pertains without departing from the range of the present disclosure claimed by the appended claims, and the modifications belong to the scope of the present disclosure.

What is claimed is:

1. A clinching-type blind hybrid fastening apparatus inserted into and fastened to a frame part which has a hollow therein, a first coupling hole at an upper plate thereof and a second coupling hole aligned with the first coupling hole in a vertical direction at a lower plate thereof, the apparatus comprising:
a body part which is inserted into the frame part and extends in the vertical direction, through which a through-hole is formed on an inner side thereof in the vertical direction, wherein a fastening screw thread is formed in an inner circumference of the through-hole and an outer lower surface rim of the body part is seated on an upper surface rim around the second coupling hole, the fastening screw thread occupies less than half of the inner circumference of the through-hole and is located on an upper half part of the inner circumference of the through-hole;
a blind fastening part including a rivet fastening portion that integrally extends upward from an upper end rim of the body part and has an upper end disposed above the first coupling hole, a close contact step portion that is integrally formed at an upper portion of the rivet fastening portion and sets to exceed a thickness of the rivet fastening portion, and a head portion that is integrally curved and extends outward along a circumference from an upper end of the close contact step portion to face an upper surface rim around the first coupling hole in the vertical direction; and
a clinching fastening part that is integrally extending downward from a lower end of the body part along a rim of the through-hole and has a lower end disposed below the second coupling hole,
wherein an upper surface of the close contact step portion is integrally connected to and stepped with a lower surface of the head portion, a lower surface of the close contact step portion is integrally connected to and stepped with an upper portion of the rivet fastening portion,
a distance between the upper surface and the lower surface of the close contact step portion is equal to a thickness of the upper plate of the frame part and
an outer diameter of the close contact step portion is set to correspond to an inner diameter of the first coupling hole,
wherein, in the blind fastening part, a recessed portion is recessed downward into the rivet fastening portion, and a central portion of a bottom surface of the recessed portion communicates with the through-hole,
wherein a sum of lengths of the body part, the blind fastening part, and the clinching fastening part is set to exceed an interval between the first coupling hole and the second coupling hole, and a length of the body part in the vertical direction is set to a length less than an interval between the first coupling hole and the second coupling hole, therefore the body part is configured to be inserted into the frame part, and the blind fastening part and the clinching fastening part are configured to be plastically deformed and respectively riveted to the lower surface rim around the first coupling hole and the lower surface rim around the second coupling hole, wherein an outer diameter of the rivet fastening portion is set to be less than an inner diameter of the first coupling hole, an outer diameter of the head portion is set to exceed the inner diameter of the first coupling hole, and an outer diameter of the clinching fastening part is set to correspond to the inner diameter of the second coupling hole.

2. The clinching-type blind hybrid fastening apparatus of claim 1, wherein a length of the rivet fastening portion in the vertical direction is set to exceed a thickness of the first coupling hole in the vertical direction.

3. The clinching-type blind hybrid fastening apparatus of claim 1, wherein a length of the clinching fastening part in the vertical direction is set to exceed a thickness of the second coupling hole in the vertical direction.

\* \* \* \* \*